Feb. 28, 1967 — N. F. PUTNAM — 3,306,457
DRUM FILTER
Filed Sept. 16, 1963 — 3 Sheets-Sheet 2

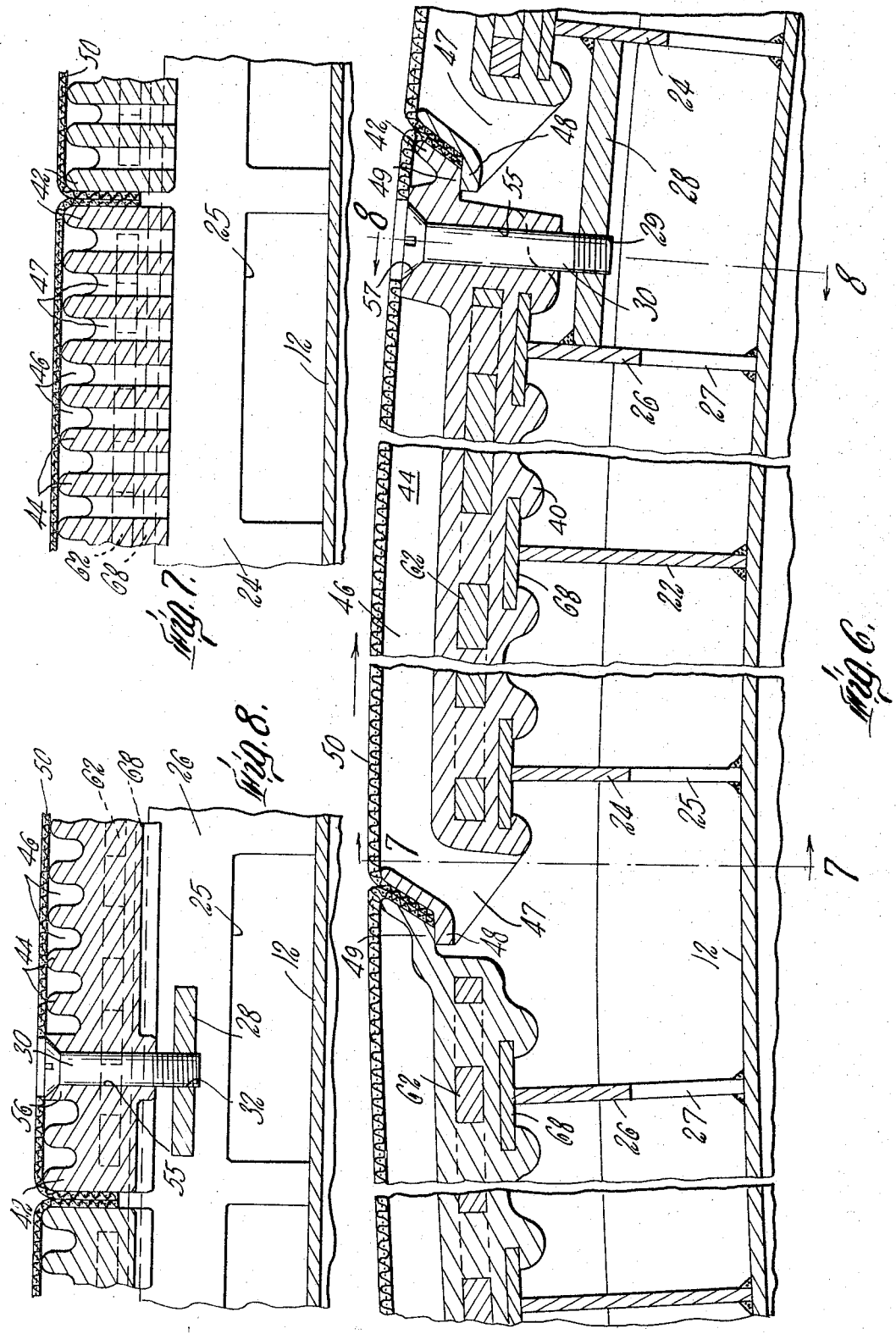

3,306,457
DRUM FILTER

Neil F. Putnam, Nashua, N.H., assignor, by mesne assignments, to Improved Machinery Inc., Nashua, N.H., a corporation of Delaware
Filed Sept. 16, 1963, Ser. No. 308,983
11 Claims. (Cl. 210—330)

This invention relates to drum filters and more particularly to a novel construction of the filter surfaces and underlying filtrate compartments thereof.

Heretofore, the conventional rotary drum filter or "screen," such as is commonly used in the separation of wood pulp from its filtrate, was of generally cylindrical shape of dimensions up to about 20′ long and 14′ in diameter and rotated in a slurry contained in a suitable vat. The outer surface of the drum was provided with radially extending ribs about 2 to 8 inches high mounted on the drum generally axially thereof on about 2 to 5 inch spacing. These ribs in turn supported on their outer edges spaced wires of round or other cross section which were generally wound circumferentially of the drum and supported a screen of suitable mesh forming the filtering surface. The spaces between the ribs were usually connected either centrally or at their ends individually or in groups to a plurality of openings in the drum which communicated with a plurality of longitudinally extending manifolds spaced about the drum. Such manifolds were generally connected to a single port valve so that they were operated as the drum revolved to apply reduced pressure to the filter surface. Other forms of supporting grids having generally similar manifolding arrangements were also used.

In the usual cycle, such arrangement provided for filter cake accretion and filtrate separation for countercurrent flow operation, if desired, the wash water being provided by suitable showers spaced about the drum, as well as the elimination of the suction and/or application of positive pressure for discharge of the filter cake as by a doctor or other suitable means. In a typical cycle of operation of such prior art structure, assuming clockwise rotation of the drum, suction applied to the manifolds connected to the drum surface between its 4 o'clock to 8 o'clock position moved water through the filter surface and so accreted the filter cake. As the manifold moved between its 8 and 10 o'clock positions, the reduced pressure extracted water from the cake and pulled air through the cake to dry it. A shower might be applied to the 10 o'clock position and again the cake was either dried or more showers or press rolls used for washing or thickening from the 10 to 2 o'clock position where atmospheric air might be introduced into the manifold so that the filter cake could be removed from the drum by the usual scraper blade or other devices. The atmospheric air introduced into the just-discharged manifold then had to be removed by the vacuum source before the cycle could begin again.

Such drums have serious limitations, both as to construction and operation, which are solved by the novel construction of the present invention.

One of the more important of the operational limitations has to do with the inability of drum filters of the conventional construction above described to achieve rapid and simultaneous enough removal of water and other liquid from all passages adjacent to the filter cake, to prevent reabsorption or "reblotting." This was because water or other liquid passing through the filter cake had to pass through the covering wire screen into the channels between the ribs, be accelerated as it passed along the channels between the ribs to move it along said channels for distances varying up to about 10 feet to the central or end opening in the drum and thence had to move along manifolds sometimes of differing lengths from the drum opening to the port valve. Not only did much of the water have to be moved axially of the drum for relatively great distances, but the gravity separation of air and water in the channels made such movement relatively slow because the water flowed primarily by gravity. That is, since the air and water were both simultaneously present in the large cross section, generally horizontal passageways, they naturally separated, so that when the reduced pressure was applied to one end of such passageways by the port valve, the air was moved along the surface of the underlying water but without much effect in causing movement of the water along the passageway toward the port valve. This slow water movement was also responsible for causing incomplete separation of wash waters, etc., from one another because of the differences in the distances and hence times required for the flow of water from different, axially spaced, portions of the drum surface to the port valve. Accordingly, although the water from the filter cake on the portion of the filter surface nearest to the port valve might have passed through the port valve prior to the time the drum rotated sufficiently to advance that same portion of the filter surface to the succeeding washing stage, that water from the portion of the filter surface in the same angular position on the drum but located most remote axially from the port valve still had not yet reached the port valve and so would become mixed with the succeeding wash water as the first part thereof began to pass into the port valve. Naturally, this effect became more serious with longer drum passages and higher speeds and with large drums tended to limit the maximum speed of rotation and hence production as well. Also, since the drum passages were generally horizontal, extending axially of the drum along the filter surface, the drainage, as well as being slow, tended also to be incomplete and so caused reblotting by reabsorption of the undrained liquid into the filter cake itself, particularly when the reduced pressure was released for cake removal. Hence, for these reasons, separation from washing stage to washing stage was incomplete, which decreased the efficiency of the washing operations, particularly when countercurrent flow of wash water was employed. Even more important, removal from the filter cake of liquid before discharge of the cake was by no means as complete as desired.

The above described limitation has to some extent been solved by the drum filter construction of Patent No. 2,998,883 but with that construction, as well as the more conventional ones, there still remained serious constructional problems.

The major one of these had to do with the necessity of utilizing a single sheet of filter medium wrapped about the drum and maintained thereon by being welded together along a seam. Not only was such a sheet, which might be of dimensions of 20′ by 45′, difficult properly to apply to and retain on the periphery of the drum, but any damage thereto, even if it affected but a small area, necessitated the replacement of the entire sheet. With the drum of Patent No. 2,998,883, additionally, the peripherally grooved surface underlying the filter surface was also subject to damage which could not easily be repaired.

The present invention solves the above mentioned problems while retaining the advantages of the peripherally grooved configuration of Patent No. 2,998,883, as well as making possible the modification of conventional drum structures in order to take advantage of the present invention.

Accordingly, it is a major object of the present invention to provide a novel filter drum construction wherein the filter medium is readily replaceable in relatively small sections, so that damage to a limited area thereof is readily repaired.

It is another major object of the invention to provide a novel filter drum construction having a multiplicity of of peripherally extending passageways beneath the filter medium with discharge thereof generally centrally of a filtrate compartment and for rapid removal of filtrate from adjacent the filter cake to prevent reabsorption.

It is still another object to provide a filter which is easily started up even when free of accreted filter cake.

It is a particular feature of the invention that it is readily adapted to the modification of drum filters of conventional construction, so that they may take advantage of the invention.

In general, the rotary drum filter of the present invention utilizes a novel filter element, a plurality of such elements being mounted on axially extending ribs over an underlying drum to cover the entire surface thereof. As with a conventional drum, the axially extending ribs may form filter compartments into which the filtrate is admitted generally centrally thereof in a peripheral direction and from which filtrate is removed by a stationary center valve structure of a radial distance from the drum axis the same as that of the filtrate compartments.

The individual filter elements of the invention are preferably of generally rectangular shape defining a convex outer surface curved in the form of a portion of a cylinder and having therein a plurality of spaced parallel ridges with grooves therebetween extending in the direction of the curve of the surface, the grooves having openings providing communication between the grooves and the inner surface of the element. A sheet filter medium is provided to cover the grooved surface and is attached about the rim of the filter element, to provide the filter surface through which filtrate may pass into the grooves and thence through the openings to the other side of the filter element. A plurality of such elements are assembled with their edges in abutting relationship to provide the filtering element of the drum filter about the entire periphery thereof, and for ready replacement of any limited surface portions thereof that sustain damage.

For the purpose of more fully explaining further objects and features of the invention, reference is now made to the following detailed description of a preferred embodiment thereof, together with the following drawings, wherein:

FIG. 6 is an enlarged sectional view, taken on the line 6—6 of FIG. 2, and

Figure 1:
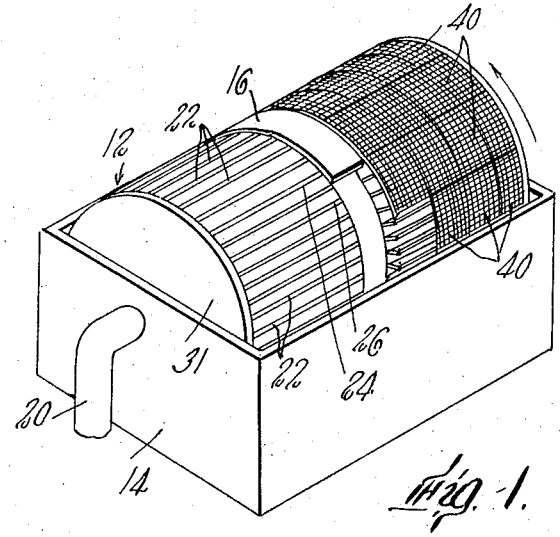
FIG. 1 is a somewhat diagrammatic view of a rotary drum filter according to the present invention partly covered by a plurality of filter elements of the invention.
Figure 2:
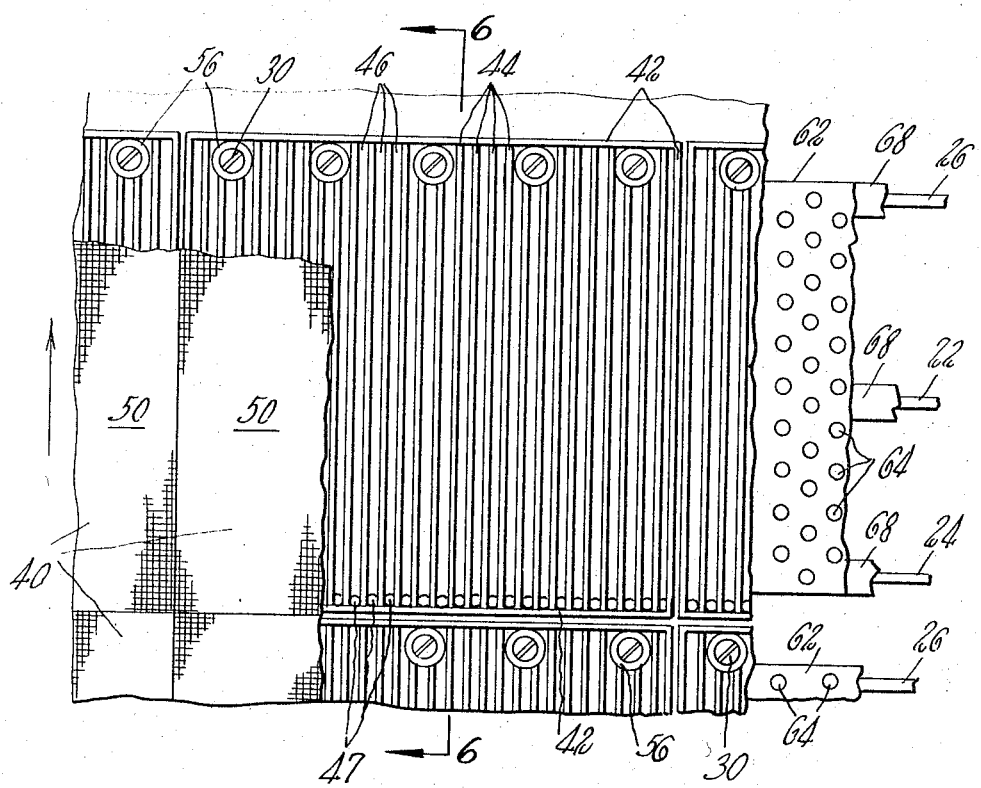
FIG. 2 is an enlarged view of a portion of the drum filter of FIG. 1, partly broken away, showing the assembly of individual filter elements thereon.
Figure 3:
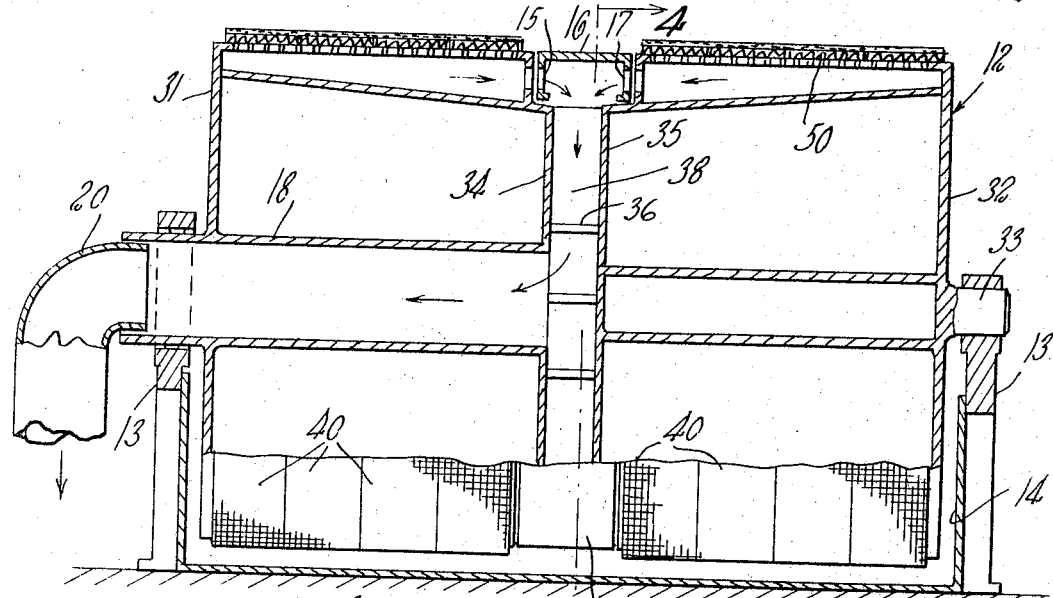
FIG. 3 is a side sectional view of the filter of FIG. 1.

FIGS. 7 and 8 are enlarged sectional views taken on the lines 7—7 and 8—8, respectively, of FIG. 6.

Refering to the drawings, in FIGS. 1 and 3–5 is diagramatically shown a rotary drum filter including a hollow cylindrical drum, generally designated 12, mounted for rotation partially submerged in a tank 14 forming a part of frame 13, said tank containing a slurry to be filtered. Drum 12 is provided with a stationary externally held valve element, generally designated 16, mounted generally centrally of the drum on its frame 13 and at least partially surrounding the drum. The valve element 16 is provided with suitable ports 15, 17 on its sides for connection to the series of axially extending filtrate compartments on each side of valve element 16, such filtrate compartments being defined at their sides by a plurality of axially extending and radially upstanding imperforate rib elements 22 spaced from one another to define a plurality of axially aligned filtrate compartments on the surface of said drum throughout its circumference. Between the imperforate rib elements are provided two similar but perforate rib elements 24, 26 having openings 25, 27 respectively therethrough. The upstanding perforate rib elements 24, 26 have connecting plates 28 extending therebetween positioned between and parallel to each pair of imperforate rib elements 24, 26, such being provided with threaded bores 29 for receiving machine screws 30 for reasons as hereinafter described. Drum end disks 31, 32 provide closed outer ends for the filter compartments, their inner ends adjacent valve element 16 being open to the valve ports. Preferably, the drum surface is sloped radially inwardly from end disks 31, 32 toward valve element 16 to aid in filtrate drainage. For discharging filtrate from the valve element, and for applying sub-atmospheric pressure thereto if desired, drum 12 is provided with a spaced pair of inner disks 34, 35 connected by axially extending tie member 36 providing a radial pasageway 38 throughout the cross-section of the drum 12, said passageway 38 having an axial connection to a suitable source of sub-atmospheric pressure through pipe 18 which forms a part of drum 12 and is rotatably mounted in frame 14, and a stationary pipe elbow 20 about which pipe 18 rotates. The other end of the drum is supported by stub shaft 33 extending outward from its end disk 32 and is rotatably mounted in suitable bearings.

Figure 4:
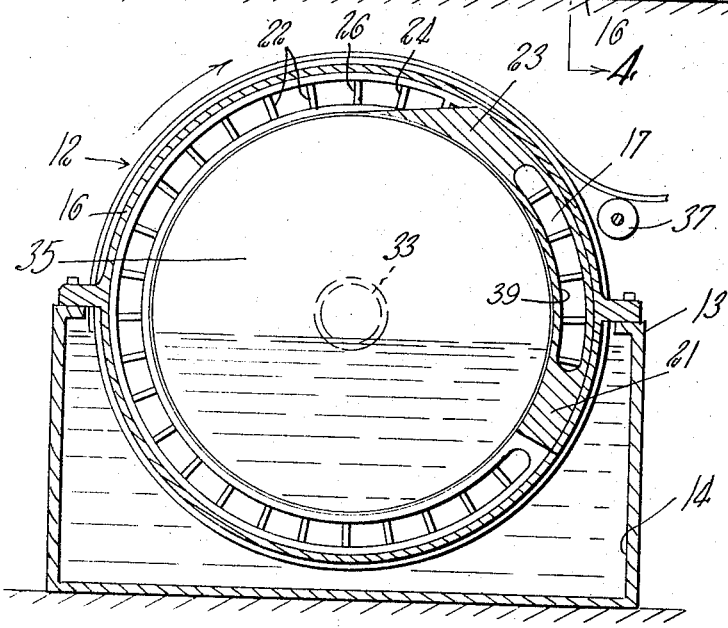
FIG. 4 is an end sectional view of the filter of FIG. 1, taken on the line 4—4 of FIG. 3.
Figure 5:
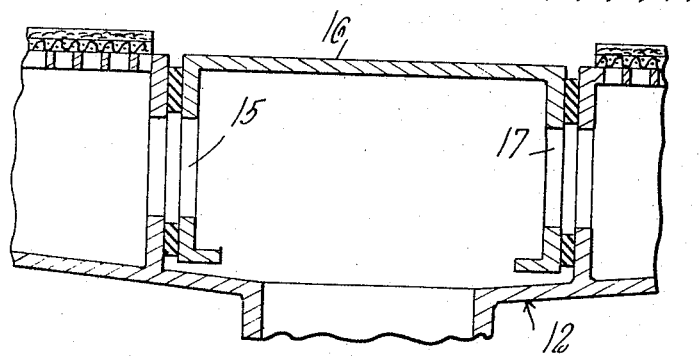
FIG. 5 is an enlarged sectional view of a portion of the filter of FIG. 1.

More specifically, the externally mounted central valve element consists of a generally rectangular cross-section housing extending from a closed end wall 21 at which point the sub-atmospheric pressure is to be applied to the filtrate compartments (at the four o'clock position for clockwise rotation as shown in FIG. 4) to another closed end wall 23 (at the one o'clock position in FIG. 4) at which point it is desired to cut off the sub-atmospheric pressure for filter cake discharge, followed by submergence of the filtrate compartments. Throughout the so defined arc, the valve element is provided with ports 15, 17 communicating with the filtrate channel open ends, so that it is in effect positioned in a channel between said open ends partly surrounding the drum for about 270 degrees so that the drum rotates within the valve element. The inner wall of the valve element is open throughout such arc for communication with the passageway between the inner disks, and the outer wall is closed. Suitable seals are provided between the stationary valve element and the rotating drum as best shown in FIG. 5. End walls 21, 23 should be wider than the distance between a filtrate compartment as defined by imperforate ribs 22 to prevent direct air flow between the accretion and discharge sectors.

With such arrangement, and with a source of sub-atmospheric pressure connected to elbow 20, filtrate will flow through the filter medium to accrete a filter cake from the four o'clock position in FIG. 4 until the filtrate passageways emerge from the slurry in the tank. They will continue to drain, and to move drying air through the filter cake until they move beyond end wall 23. In the 90 degree sector between end wall 23 and end wall 21, the sub-atmospheric pressure must be relieved for discharge of the filter cake over discharge roll 37. As shown in FIG. 4, this may best be accomplished by utilizing a solid bottom wall 39 as the bottom wall of the portion of the valve element 16 extending for said arc, venting the filtrate compartments of such portion to atmospheric air through their filter medium.

According to the invention, the filter surface provided for the drum comprises a multiplicity of generally rectangular filter elements each generally designated 40, supported in axially and peripherally extending rows on the outer edges of rib elements 22, 24, 26. The individual filter elements 40 have their adjacent edges abutting one another to cover said filtrate compartments throughout the entire surface of the drum, so that all filtrate must pass through one of the filter elements 40 in order to reach the interior of the drum, the filter cake being deposited on the surfaces of the filter elements. Preferably, each filter element 40 has an arcuate peripheral extent equal to that of one only of said filtrate compartments as defined between imperforate rib elements 22 and is supported along lines adjacent its opposite edges thereof by perforate rib elements 24, 26 with an imperforate rib element 22 supporting each said filter element adjacent the center line thereof. The axial dimension of each filter element may conveniently be generally equal to its arcuate dimension.

Each of the novel filter elements of the invention as best shown in FIGS. 2 and 6-8 is preferably of generally rectangular shape, with a closed bottom, each said element defining an outer convex surface and an inner concave surface curved in the form of a portion of a cylinder concentric with drum 12. On its outer convex surface, each element 40 has an upstanding rim 42 about the entire periphery of said element and, within its rim 42, has a multiplicity of parallel ridges 44 spaced of the order of one half inch from one another providing grooves 46 therebetween having a substantial depth of about one half inch. The ridges and grooves extend in the direction of the curve of said convex surface, that is peripherally of said cylindrical drum, with the outermost extent of said rim and said ridges defining the convex cylindrical outer surface spaced beyond the underlying surface of drum 12. A sheet filter medium 50 is provided to cover the convex side of element 40 to define filtrate passages along grooves 46, said sheet filter medium being attached to rim 42 about the entire periphery of each individual filter element. In order to provide both adequate fluid sealing as between adjacent filter elements 40 and removably to secure said elements in position on the drum, lips 48, 49 are provided along the opposed edges of filter elements 40 which extend in a direction perpendicular to said ridge respectively to overlie and underlie the lips of abutting elements. For this purpose the lip 48 along the side adjacent openings 46 has a flat surface arranged to underlie the flat inner surface of the lip 49 along the opposite side of the filter element.

In order to provide communication between the filtrate passages provided by grooves 46 through the closed bottom of the filter element 40 into one of the underlying filtrate compartments, an opening 47 is provided for each groove, said openings 47 being positioned generally along a line closely adjacent to one side of element 40 inside of its rim 42 and at the ends of said grooves away from the direction of drum rotation, for operational reasons hereinafter more fully explained.

The fastening means for removably attaching said filter elements to said drum and to each other includes in addition to lips 48, 49, bores 55 through the filter elements 40, said bores being out of communication with the interior of the filter element by reason of their surrounding cylindrical housing including a raised rim 56 to which filter medium 50 is attached. Each of said bores has an enlarged upper end 57 which extends through each said filter element as well as the sheet filter medium 50 covering said element, the latter being sealed around its rim 56. Such bores are adapted to receive machine screws 40 of the flat head type having an enlarged head which is received within the enlarged upper end of a bore 55, the shank of the screw means extending beyond the inner concave surface of the element 40 for attachment to said screw threaded receiving bore 29 in plate 28. With this fastening arrangement, the filter elements 40 may be readily attached to and removed from drum 12 as desired.

In general, when a particular filtrate compartment is in submergence, the ports 15, 17 connect such filtrate compartment to a suitable source of suction such as a vacuum pump or barometric leg which is communicated through pipes 18 and 20 and passageway 38 to the filtrate compartment defined between each pair of imperforate ribs 22 and through filter element openings 47 to the inner side of filter medium 50, causing filtrate to flow therethrough and deposit a filter cake on the outer surface of said medium. Upon emergence of a filtrate compartment from the slurry in tank 14, with the drum moving in the direction as shown by the heavy arrows in the drawings, the ends of filtrate channels as formed by grooves 46 remote from the groove openings 47 will first emerge and the filtrate will flow downwardly along the channels by gravity, in the opposite direction to that of drum movement, that is, from right to left. Since the opening 47 are at the lower end of the channels, they will themselves operate in the nature of a valveless filter, both to aid in start-up and, with a gravity filter, to itself operate as a barometric leg. The principles of the use of peripherally extending channels of small cross sectional dimensions and short length directly underlying the filter surface has been fully set forth in Patent No. 2,998,883 and hence need not be further described herein except as has been described above. As to the filtrate compartments themselves since the stationary valve structure is of the same diameter as that of the open ends of the filtrate compartment and is positioned immediately adjacent thereto, air will immediately flow directly into the emerging corner of the filtrate compartment and along it toward its remote end, so that the filtrate will be released for ready flow by gravity therealong in the direction toward its open end.

Another novel aspect of the present invention resides in the angular, peripheral displacement of the line of openings 47 of a filter element 40 with respect to its underlying filtrate compartment. More specifically, as is best shown in FIG. 6, the openings 47 connect to the filtrate compartments defined as between a pair of adjacent imperforate ribs 22 at a point about one third to one half of the distance from their leading ends in the direction of drum movement to their trailing ends. At the emergence stage of the drum cycle, such displacement is not functional. However, upon a filtrate compartment passing the 12 o'clock drum position, the displacement functions in a novel manner to trap in the volume of the filtrate compartment between its leading end and the line of openings 47 any filtrate which has not yet had an opportunity to escape through drum openings 16. This acts to prevent reabsorption by or "reblotting" of the filter cake by any filtrate which remains in the filtrate compartment, as would occur were the line of filter element openings 47 to be positioned at the leading end of a filtrate compartment.

As shown in the drawings, it is preferred that a single filter element 40 be associated with a single compartment, insofar as its peripheral dimension is concerned, and be angularly peripherally displaced with respect thereto, although such is not essential to the broad aspects of the invention. With such arrangement, however, construction is simplified, in that single complete filter elements, all identical, may be utilized, regardless of drum length or direction of rotation. Also, a single sheet of filter medium may be utilized to cover the entire drum, although this obviously fails to utilize some of the advantages of the invention.

As shown in FIGS. 2 and 6 to 8, each of the filter elements 40 may have a composite construction including a plastic material molded around a metal reinforcing plate 62 containing a series of anchoring holes 64 for gripping the molded plastic. The filter element 40 may further include a series of longitudinally extending exposed metal strips 68 attached to the underside of the element and adapted to rest on the rib elements 22, 24, and 26 to prevent the edges of the rib elements from damaging the plastic.

It will thus be seen that the novel rotary drum filter of the invention, including the novel filter element utilized

What is claimed is:

1. In a rotary drum filter having a cylindrical drum with a plurality of axially extending and radially upstanding rib members spaced from one another to define a plurality of axially extending filtrate compartments on the surface of said drum throughout its circumference, a filter surface comprising a plurality of generally rectangular filter elements supported on the outer edges of said rib members and having their adjacent edges abutting one another to cover said filtrate compartments throughout the surface of said drum, each said filter element being of generally rectangular shape defining an outer convex surface curved in the form of a portion of a cylinder, said element having on its convex surface upstanding rim means about the entire periphery of said element, a plurality of spaced parallel ridges with grooves therebetween extending in the direction of the curve of said convex surface with the outermost extent of said rim means and said ridges defining said convex surface, a filter means covering the convex side of said element defining filtrate passages along said grooves, and opening means providing the sole communication between said grooves and the inner surface of said element, said opening means being positioned generally along a line closely adjacent to one side of said element inside of said rim means.

2. In the filter as claimed in claim 1, wherein said filter element is of composite construction including an inner perforated metallic reinforcing plate with a plastic material molded therebout covering said plate and conforming to the outer surface configuration of said element.

3. In the filter as claimed in claim 2, further including exposed metallic strips extending along the concave surface of said element in a direction perpendicular to said ridges.

4. In a rotary drum filter having a cylindrical drum with a plurality of axially extending and radially upstanding rib members spaced from one another to define a plurality of axially extending filtrate compartments on the surface of said drum throughout its circumference, a filter surface comprising a plurality of generally rectangular filter elements supported on the outer edges of said rib members and having their adjacent edges abutting one another to cover said filtrate compartments throughout the surface of said drum, each said filter element being of generally rectanguar shape defining an outer convex surface curved in the form of a portion of a cylinder and having on its convex surface upstanding rim means about the entire periphery of said element, a plurality of spaced parallel ridges with grooves therebetween extending in the direction of the curve of said convex surface and peripherally of said cylindrical drum with the outermost extent of said rim means and said ridges defining said convex surface, opening means providing communication between said grooves and the inner surface of said element, said opening means being positioned generally along a line closely adjacent to one side of said element inside of said rim means and at the ends of said grooves away from the direction of drum rotation, a sheet filter medium covering the convex side of said element defining filtrate passages along said grooves, said sheet filter medium being attached to said rim means about the periphery of said element.

5. A filter surface as claimed in claim 4, wherein said filter elements further include lip means along opposed edges of said filter elements respectively to overlie and underlie lip means of adjacent elements, and means for removably attaching said filter elements to said drum.

6. A filter surface as claimed in claim 5, wherein said means for removably attaching said filter elements to said drum includes a plurality of enclosed bores having an enlarged upper end through each said filter element and the sheet filter medium covering said element, and screw means having an enlarged head within said enlarged upper end, said screw means extending beyond the concave surface of said element for attachment to cooperating elements on said drum.

7. A rotary drum filter including a cylindrical drum with a plurality of axially extending and radially upstanding imperforate rib members spaced from one another to define a plurality of axially extending filtrate compartments on the surface of said drum throughout its circumference, with a pair of upstanding perforate rib members having screw threaded receiving means therebetween positioned between and parallel to each pair of imperforate rib members, a filter surface comprising a plurality of generally rectangular filter elements supported on the outer edges of said rib members and having their adjacent edges abutting one another to cover said filtrate compartments throughout the surface of said drum, each said filter element having an arcuate extent equal to that of one only of said filtrate compartments and being supported along a line adjacent opposite edges thereof by perforate rib members with an imperforate rib member supporting each said filter element adjacent the center line thereof, each said filter element being of generally rectangular shape defining an outer convex surface curved in the form of a portion of a cylinder and having on its convex surface upstanding rim means about the entire periphery of the said element, a plurality of spaced parallel ridges with grooves therebetween extending in the direction of the curve of said convex surface and peripherally of said cylindrical drum with the outermost extent of said rim means and said ridges defining said convex surface, lip means along the opposed edges of said element extending in a direction perpendicular to said ridges respectively to overlie and underlie lip means of abutting elements, opening means providing communication between said grooves and one of said filtrate compartments, said opening means being positioned generally along a line closely adjacent to one side of said element inside of said rim means and at the ends of said grooves away from the direction of drum rotation, a sheet filter medium covering the convex side of said element defining filtrate passages along said grooves, said sheet filter medium being attached to said rim means about the periphery of said element, and fastening means for removably attaching said filter elements to said drum including an enclosed bore in each of said filter elements having an enlarged upper end through each said filter element and the sheet filter medium covering said element, and screw means having an enlarged head within said enlarged upper end, said screw means extending beyond the concave surface of said element for attachment to said screw threaded receiving means.

8. A rotary drum filter including a cylindrical drum, a plurality of axially extending and radially upstanding imperforate rib members spaced from one another to define a plurality of axially extending filtrate compartments on the surface of said drum throughout its circumference, a plurality of axially and peripherally extending filter elements on the outer edges of said rib members and having their adjacent edges abutting one another to cover said filtrate compartments throughout the surface of said drum, each said filter element having an arcuate extent less than that of said drum and equal to that of at least one of said filtrate compartments and being of a shape defining an outer convex surface curved in the form of a portion of a cylinder and having on its convex surface a plurality of spaced parallel ridges with grooves therebetween extending in the direction of the curve of said convex surface and peripherally of said cylindrical drum, opening means providing the sole communication between said grooves and one of said filtrate compartments, said opening means being positioned generally along a line closely adjacent to one side of said element at the ends of said grooves away from the direction of drum rotation, and a sheet filter medium covering the convex side of said element defining filtrate passages along said grooves.

9. A rotary drum filter including a cylindrical drum having an axis of rotation, a plurality of axially extending arcuate filtrate compartments having axially spaced ends and peripherally spaced ends on the surface of said drum throughout its circumference at a predetermined radial distance from said axis, fixed valve means for connecting a source of sub-atmospheric pressure to said filtrate compartments, said valve means being positioned immediately adjacent at least one of the axially spaced ends of said filtrate compartments, at said predetermined radial distance from said axis, filter means covering said filtrate compartments throughout the surface of said drum, said filter means defining an outer convex surface and having on its said convex surface a plurality of spaced parallel ridges with grooves therebetween extending in the direction of the curve of said convex surface and peripherally of said cylindrical drum, and a plurality of axially extending opening means providing the sole communication between said grooves and said filtrate compartments, with said opening means being displaced generally centrally of said filtrate compartments between the peripherally spaced ends thereof.

10. A rotary drum filter including a cylindrical drum rotatably mounted for rotation about a central axis, said drum having openings communicating therethrough, said openings being arranged in a plurality of axially extending series with one of said series in each of a plurality of angularly spaced positions around said drum, a plurality of axially extending filtrate compartments within said drum spaced from the central axis of said drum adjacent said openings, with one of each of said series of openings providing the sole communication with one of said filtrate compartments, each series of said openings being circumferentially spaced from adjacent series of openings by a distance substantially equalling the circumferential dimension of each said filtrate compartment, and with said one series spaced generally centrally of said one filtrate compartment, valve means positioned adjacent an axial end of each of said filtrate compartments, means for applying a sub-atmospheric pressure to said filtrate compartments and openings through said valve means, and means supported on the outer periphery of said drum defining a filter surface spaced outwardly from said drum periphery, said last-mentioned means providing a multiplicity of relatively short peripherally extending passageways between said drum and said filter surface communicating with said filter surface along substantially their entire length and connected to and communicating with at least one of said series of openings.

11. A rotary drum filter including:
a cylindrical drum;
a plurality of axially extending and radially upstanding imperforate rib elements spaced from one another to define a plurality of axially extending filtrate compartments located on the surface of said drum around its circumference;
a plurality of axially and peripherally extending arcuate cover elements having an inner surface supported on the outer edges of said rib elements to provide an annular ring of cover elements circling said drum and a cover for the major arcuate portion of each of said filtrate compartments throughout the surface of said drum;
peripherally extending and axially spaced ridge element means supported on the outer surface of each of said cover elements providing a multiplicity of ridge elements spaced from one another in an axial direction forming a multiplicity of peripherally extending grooves therebetween;
a foraminous filter means covering the outer side of said ridge element means defining filtrate passages along said grooves; and
opening means located in said annular ring of cover elements at circumferentially spaced locations for discharging the filtrate passages on the outer surface of each of said cover elements into a filtrate compartment located under that cover element, the circumferential spacing between said opening means being substantially the same distance as the circumferential spacing between adjacent rib elements.

References Cited by the Examiner
UNITED STATES PATENTS

| | | | |
|---|---|---|---|
| 1,795,634 | 3/1931 | Boykin | 210—402 |
| 2,263,852 | 11/1941 | Oliver et al. | 210—391 X |
| 2,289,411 | 7/1942 | Denhard et al. | 210—232 X |
| 2,724,507 | 11/1955 | Cataldo | 210—404 |
| 3,150,082 | 9/1964 | Rich | 210—404 X |
| 3,233,736 | 2/1966 | Vernay | 210—406 X |

FOREIGN PATENTS 115,030 4/1942 Australia.

REUBEN FRIEDMAN, *Primary Examiner.*

J. DE CESARE, *Assistant Examiner.*